Figure 1:
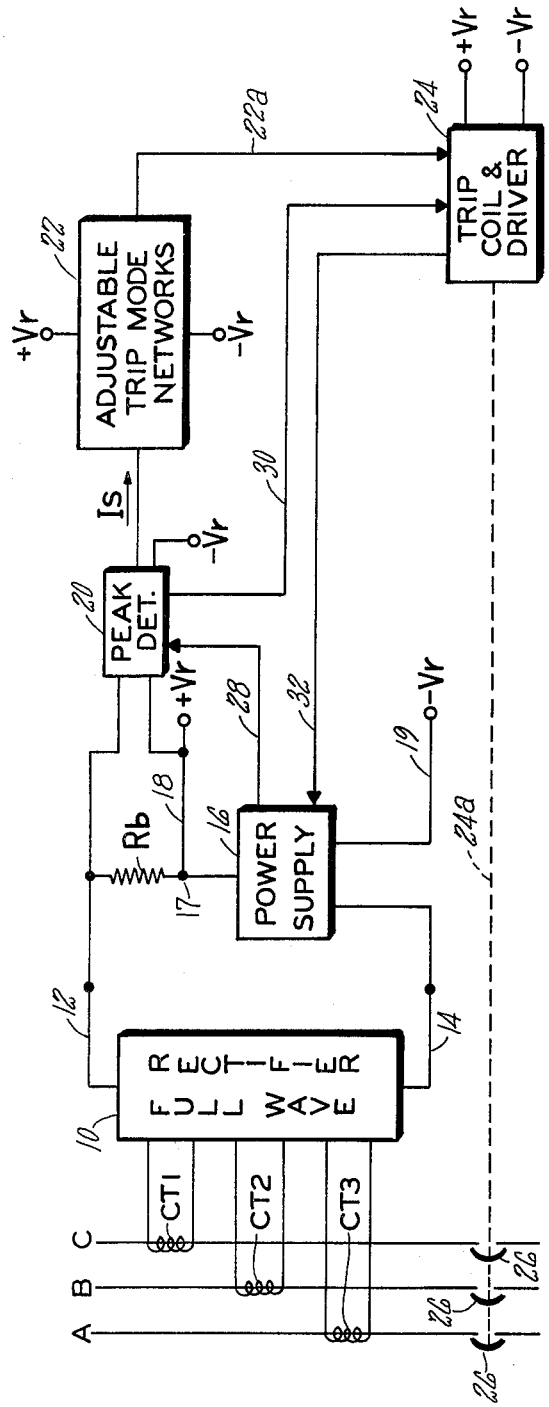

United States Patent [19]
Howell

[11] 4,271,447
[45] Jun. 2, 1981

[54] POWER SUPPLY FOR CIRCUIT BREAKER STATIC TRIP UNIT

[75] Inventor: Edward K. Howell, Simsbury, Conn.

[73] Assignee: General Electric Company, New York, N.Y.

[21] Appl. No.: 62,388

[22] Filed: Jul. 31, 1979

[51] Int. Cl.³ .............................................. H02H 3/08
[52] U.S. Cl. ......................................... 361/93; 361/98
[58] Field of Search ............................. 361/42, 44–50, 361/93–98

[56] References Cited
U.S. PATENT DOCUMENTS

| 4,115,829 | 9/1978 | Howell | 361/42 |
| 4,131,929 | 12/1978 | Moran | 361/93 |

Primary Examiner—Harry E. Moose, Jr.
Attorney, Agent, or Firm—Robert A. Cahill; Walter C. Bernkopf; Philip L. Schlamp

[57] ABSTRACT

A low power dissipation power supply utilizes a chopper shunt voltage regulator operating to either direct current transformer developed charging current to storage capacitors when the supply voltage drops below a nominal level or to shunt charging current from the storage capacitors when the supply voltage exceeds the nominal level. Switching of the regulator is controlled by the very small voltage ripple in the regulated supply voltage. In application to a circuit breaker static trip unit, the power supply is equipped to inhibit trip unit functions until the supply voltage is sufficiently up and to limit trip coil actuating current.

8 Claims, 2 Drawing Figures

U.S. Patent    Jun. 2, 1981    4,271,447

POWER SUPPLY FOR CIRCUIT BREAKER STATIC TRIP UNIT

BACKGROUND OF THE INVENTION

Electronic solid state, i.e., static trip units are being implemented in increasing numbers in industrial circuit breakers in place of the traditional thermal-magnetic and dual magnetic trip units to initiate circuit interruption automatically in response to an overcurrent condition. The increasing popularity of static trip circuit breakers is largely due to their inherent versatility. That is, the breaker static trip unit is readily susceptible to convenient trip setting adjustability such that a highly repeatable trip-time curve can be rather precisely tailored to the load for full overcurrent protection thereof ranging from light overload to heavy short circuit proportions. Another attractive aspect of static trip units is the fact that they can be readily and economically supplemented to afford ground fault protection, as well as overcurrent protection, to load circuits.

Typically, these static trip units are self-powered in that, rather than being powered from a separate electrical source, they receive operating power from the same source feeding the protected load circuit. More specifically, current transformers, one coupled with each phase or line conductor of the protected load circuit, are utilized to develop secondary currents proportional to the load circuit phase currents for application to the static trip unit. From these secondary currents, the static trip unit extracts sufficient energy to electrically power itself while preserving the informational or signal content thereof regarding the phase current magnitudes.

With the electronic circuitry miniaturization capability afforded by now available micro-electronic technology, the physical size of static trip units can be significantly reduced to the point where they can be incorporated in ever smaller molded case circuit breaker frame sizes. In doing so, a significant factor to be considered is the power dissipation of the trip unit itself, inasmuch as there are rather stringent limitations on the permissible temperature rise above ambient occurring within the molded case when the breaker is carrying its rated current.

It is accordingly an object of the present invention to provide a self-powered, molded case circuit breaker static trip unit having extremely low power dissipation.

An additional object is to provide a static trip unit of the above character having an improved voltage regulating power supply.

Yet another object is to provide an improved static trip unit power supply of the above character which is capable of preventing erroneous static trip unit operation.

A further object is to provide an improved static trip unit power supply of the above character which operates to protect trip unit components from malfunction and/or damage in the event of high fault currents flowing in the protected load circuit.

Still another object is to provide an improved static trip unit power supply which is efficient in construction and reliable in operation.

Other objects of the invention will in part be obvious and in part appear hereinafter.

SUMMARY OF THE INVENTION

In accordance with the present invention, there is provided an improved, low power dissipation, voltage regulating power supply having specific, but not limited application to circuit breaker static trip units. In this application to static trip units, full wave rectified secondary current developed by phase current transformers is directed by a chopper shunt voltage regulator to either charge energy storage capacitors when the trip unit supply voltage falls below a nominal level or shunt secondary current from the storage capacitors when the supply voltage rises above the nominal level. This alternating rise and fall of the supply voltage developed across positive and negative voltage buses creates a ripple voltage superimposed on the nominal, regulated supply voltage level which is utilized to control a regenerative trigger circuit operating to, in turn, control a power transistor in switching the chopper voltage regulator between its capacitor charging and capacitor shunting states.

The power supply of the present invention is also equipped to inhibit trip unit functioning during initial start-up when the storage capacitors are being charged from an essentially discharged state. Under these conditions, the supply voltage is rising from essentially zero and thus, until it approaches its normal level, proper functioning of the trip unit cannot be assured.

In accordance with yet another feature of the present invention, the power supply, which is utilized to actuate the circuit breaker trip coil interfacing the trip unit electronics with the mechanical circuit breaker trip mechanism pursuant to initiating a trip function, is automatically conditioned to limit the trip coil actuating current once a trip function has been irrevocably initiated. Thus the trip coil cannot be overdriven to the point of causing it to malfunction and/or suffer damage, a particular concern in the case of high fault currents.

The invention accordingly comprises the features of construction, combination of elements and arrangement of parts which will be exemplified in the construction hereinafter set forth, and the scope of the invention will be indicated in the claims.

Figure 2:
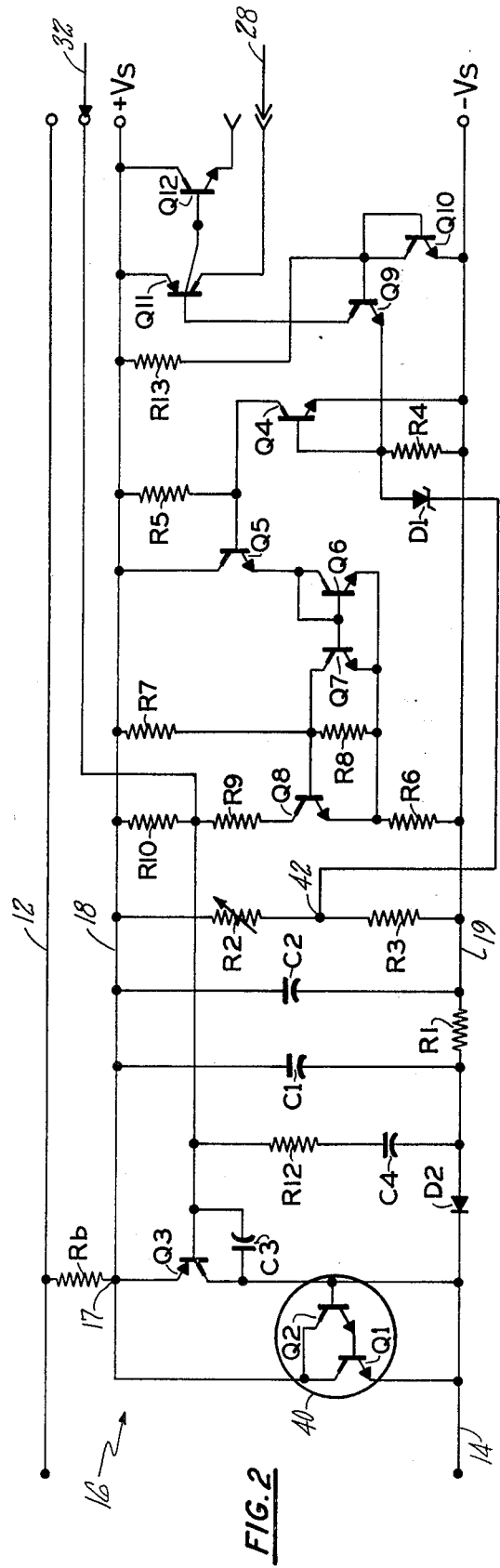

For a fuller understanding of the nature and objects of the present invention, reference should be had to the following detailed description taken in conjunction with the accompanying drawing wherein:

FIG. 1 is a schematic block diagram of a circuit breaker static trip unit embodying the present invention; and FIG. 2 is a detail circuit schematic diagram of the improved power supply of the present invention as utilized in the static trip unit of FIG. 1.

Corresponding reference numerals refer to like parts throughout the several views of the drawing.

Referring to FIG. 1, a static trip unit is disclosed for incorporation in a circuit breaker pursuant to providing overcurrent protection for a three-wire power distribution circuit consisting of three line or phase conductors A, B and C. The currents in these three phase conductors are individually sensed by current transformers CT1, CT2 and CT3. The multi-turn secondary windings of these current transformers are connected to a full-wave diode rectifying network, generally indicated at 10, whose construction may be that disclosed in applicant's commonly assigned U.S. Pat. No. 4,115,829. Positive going full-wave rectified current flows out of rectifying network 10 on bus 12 and returns via negative bus 14. The current on bus 12 flows through a burden resistor Rb pursuant to developing a voltage thereacross of a magnitude proportional to the magnitude of the highest of the phase currents flowing in conductors A, B and C. A power supply 16 is connected between the lower end of burden resistor Rb and negative bus 14. As will be seen in FIG. 2, this power supply functions to develop on a bus 18 connected at its junction 17 with positive relative to the voltage appearing on bus 19. Buses 12 and 18 are also connected as separate inputs to a peak detector 20 so as to respond to the signal voltage developed across burden resistor Rb. Thus, this signal voltage is superimposed on the regulated positive supply voltage Vr appearing on bus 18. Peak detector 20, which is preferably of the construction disclosed in my commonly assigned application entitled "Fast Recovery Peak Detector" filed concurrently, herewith, converts this signal voltage to a proportionate current signal which is supplied to adjustable trip mode networks 22. These trip mode networks, which typically include a long-time trip mode network, a short-time trip mode network, and an instantaneous trip mode network, are individually operative, depending upon the magnitude of its input current signal to issue a trip signal over lead 22a to a trip coil driver circuit, generally indicated at 24. In response to this trip signal, the driver circuit triggers a thyristor pursuant to completing an energization circuit between power supply buses 18 and 19 for a circuit breaker trip coil. Consequent actuation of the trip coil is, as diagrammatically indicated at 24a, coupled with circuit breaker contacts 26 pursuant to tripping them to open circuit positions and thereby interrupt current flow in all three phase conductors of the distribution circuit.

Still referring to FIG. 1, power supply 16 applies a disabling input via lead 28 to peak detector 20, and the latter, in turn, disables driver circuit 24 via lead 30 to inhibit operation of these components until the power supply voltage Vr developed across buses 18 and 19 arises essentially to its regulated level. Thus, spurious operation of these components in response to the presence of signal voltages across the burden resistor Rb is avoided during that very short interval while the power supply 16 is raising the supply voltage up to its regulated level. In addition, the trip coil driver circuit 24 supplies a signal over lead 32 back to power supply 16 once a trip function has been irrevocably initiated. This signal is effective in a controlling power supply 16 to collapse the regulated supply voltage across buses 18 and 19, thus preventing overdriving of the trip coil as can readily occur during the interruption of high fault currents flowing in any one of the distribution circuit phase conductors. Excessive driving current can damage the trip coil or cause it to malfunction.

Turning to FIG. 2, power supply 16 includes a Darlington-connected power transistor pair 40 which may be of the type commercially available under the designation D44E1. This Darlington pair includes a first transistor Q1 and a second transistor Q2 whose collectors are connected in common and thence to junction 17 and regulated voltage bus 18. The emitter of transistor Q1 is connected to rectifier bus 14, while its base is directly connected to the emitter of transistor Q2. Junction 17 is also connected to the emitter of a transistor Q3, which may be a 2N5087. The collector of this transistor is connected in common with the base of transistor Q2 and bus 14. A capacitor C1 is connected between the base and collector of transistor Q3 for the purpose of limiting the rate of change of voltage developed across the collector-emitter junctions of transistors Q1 and Q2.

Connected between regulated positive voltage bus 18 and negative bus 19 are a pair of storage capacitors C1 and C2 whose negative terminals are separated by a small buffer resistor R1 serially connected between the rectifier negative output bus 14 and regulated negative voltage bus 19. These storage capacitors are preferably solid-tantalum electrolytic capacitors. Also connected across buses 18 and 19 is a voltage divider consisting of resistors R2 and R3. The value of resistor R2 is adjusted such that when bus 18 is in precise voltage regulation, for example, 15 volts, the voltage appearing at junction 42 between R2 and R3 is equal to the zener voltage of a zener diode D1 plus the base-emitter voltage drop of a transistor Q4, as developed across resistor R4. The combination of zener diode D1 and transistor Q4 are utilized in this fashion so as to provide temperature stability, inasmuch as they have essentially equal and opposite temperature coefficients when implemented in integrated circuitry.

When the regulated supply voltage Vr on bus 18 falls below the nominal 15 volt regulated level, insufficient current flows through zener diode D1 to develop the requisite base-emitter voltage across resistor R4 to maintain transistor Q4 conductive. Consequently, this transistor no longer shunts base drive current from the base of a transistor Q5 through its collector-emitter circuit to negative bus 19. Consequently, transistor Q5 now receives base drive current from bus 18 through resistor R5, and this transistor turns on to conduct current through its collector-emitter circuit, diode connected transistor Q6 and resistor R6 to negative bus 19. The common base and collector of transistor Q6 is connected to the base of a transistor Q7. The emitters of these two transistors are connected in common to the upper end of resistor R6. The collector of transistor Q7 is connected to the base of a transistor Q8 and to positive bus 18 through a resistor R7. A resistor R8 is connected in shunt with the collector-emitter circuit of transistor Q7. The collector of transistor Q8 is connected to the base of transistor Q3 through a resistor R9 and also to regulated voltage bus 18 through a resistor R10, while its emitter is commonly connected with the emitters of transistors Q6 and Q7 to the upper end of resistor R6.

The values of resistors R5 and R6 are selected such that the current flowing through transistors Q5 and Q6 is of a magnitude so as to initially develop approximately 13.5 volts across resistor R6. The current from transistor Q5 flowing through transistor Q6 causes transistor Q7 to saturate, thus depriving transistor Q8 of base drive current flowing from regulated voltage bus 18 through resistor R7. Consequently, transistor Q8 is turned off, and no current can be drawn through resistors R9 and R10 or through the emitter-base junction of transistor Q3 such as to turn this transistor on. With transistor Q3 turned off, there is no base drive current available to transistors Q1 and Q2 of Darlington pair 40, and consequently it is switched off. It is thus seen that the current transformer secondary current available on bus 12 is directed through burden resistor Rb onto bus 18 where it becomes available to charge storage capacities C1 and C2. As the charge on these capacitors increases, the regulated voltage Vr on bus 18 begins rising, as does the voltage at junction 42 between resistors R2 and R3. The resulting zener current flowing through zener diode D1 drives transistor Q4 into conduction. The collector voltage of this transistor falls, forcing a decrease in the emitter voltage of transistor Q5. The current flowing through transistor Q6 thus decreases, as does the voltage drop developed across resistor R6. The voltage at the emitter of transistor Q7 is pulled down, and thus the current flowing through its collector-emitter circuit increases. When the collector currents of transistors Q7 and Q6 are approximately equal, transistor Q7 pulls out of saturation, causing its collector voltage to rise. At this point, transistors Q6 and Q7 function as a current mirror, such that collector current of transistors Q7 follows or mirrors the collector current of transistor Q6. With transistor Q7 pulled out of saturation, its collector voltage rises, and a base-emitter voltage for transistor Q8 begins to develop across resistor R8. Transistor Q8 then begins to conduct, and its emitter current begins supplying the voltage dropped across resistor R6 in lieu of the emitter current from transistor Q6. The collector current in transistor Q6 thus decreases, forcing the collector current of transistor Q7 to also decrease. More base drive current is thus made available for transistor Q8, driving it further into conduction.

It is thus seen that the decrease in the current in transistor Q6 regeneratively causes the current in transistor Q8 to increase, ultimately driving the latter into full conduction. With transistor Q8 in full conduction, it serves as a current source of base drive current for transistor Q3 drawn from bus 18 through resistor R9, the collector-emitter circuit of transistor Q8 and resistor R6. Transistor Q3 thus turns on to supply base drive current for transistors Q1 and Q2 of Darlington pair 40. These transistors go into full conduction to shunt the charging current available on bus 18 from the storage capacitors C1 and C2. At this time, diode D2, serially connected with resistor R1 between buses 14 and 19, is back biased, forcing the discharge current of the storage capacitors to flow into the trip unit and power its various operating components.

As these capacitors discharge, the regulated voltage on bus 18 begins to fall. When it falls below its nominal 15 volt level, the voltage at junction 42 no longer drives sufficient current through zener diode D1 to develop the requisite voltage across resistor R4 to maintain transistor Q4 in full conduction. Consequently, the collector voltage of this transistor begins to rise, raising the base potential on transistor Q5. Since this transistor is connected as an emitter follower, its emitter voltage begins to rise, causing current to flow through transistor Q6 and the base emitter junction of transistor Q7. As the collector current of transistor Q6 increases, so does the collector current of Q7 with the result that this latter transistor begins depriving transistor Q8 of base drive current. As transistor Q8 is pulled out of conduction, its emitter current decreases, causing the emitter current of transistor Q6 to increase pursuant to supplying the voltage drop across resistor R6. This action proceeds regeneratively to completely turn off transistor Q8 of base drive voltage. Base drive for transistor Q3 is thus cut off, and it goes non-conductive to switch Darlington transistor pair 40 off. The charging current available on bus 18 is again made available to pump charge into the storage capacitors C1 and C2.

From the foregoing description, it is seen that zener diode D1 functions in response to the rise and fall of the voltage, i.e., ripple voltage, on regulated voltage bus 18 to control a regenerative trigger circuit, consisting of transistors Q6, Q7 and Q8, in switching the Darlington pair between its fully conductive and fully off states, in switching shunt voltage regulator fashion. By way of example, a peak-to-peak ripple voltage of 100 millivolts may be utilized in establishing the switching criteria for the Darlington pair in achieving true class D (chopper) shunt voltage regulator operation. It will be appreciated that when Darlington pair 40 is off, it conducts no current and thus dissipates no power. When it is fully on, the voltage across the collector-emitter of transistor Q1 is very low, e.g., 1.5 volts, and thus power dissipation is correspondingly quite low, e.g., considerably less than one watt under normal operating conditions. This is contrasted with the power supply shown in the above-noted, commonly assigned U.S. Pat. No. 4,115,825, wherein the shunt voltage regulator is not switched and thus operates in class A fashion. Since the voltage regulator in that patent continuously drains current from the positive voltage bus to hold it in regulation with the full regulated voltage impressed across it, its power dissipation is significantly greater.

As previously noted, capacitor C1, connected between the collector and base of transistor Q3, limits the rate of change of voltage across the Darlington pair 40. This limits the charging/discharging currents of the capacitances in the current transformers CT1, CT2, and CT3, thus reducing high frequency ripple in the current waveforms and the generation of high frequencies which can be coupled back into the distribution system in the form of noise.

A second feedback capacitor C4, connected in series with a damping resistor R12 between the base of transistor Q3 and the anode of diode D2, limits the rate of change of charging current for capacitors C1 and C2. This negative feedback is used to compensate for the equivalent series resistance of these electrolytic capacitors and serves to limit the reverse current in diode D2 in order to reduce high frequencies generated by the reverse-recovery characteristics of this diode. Preferably, a fast recovery type diode, such as an A114A, is utilized in order to reduce high frequency generation typically incurred with the "snap-off" recovery characteristics of normal slow-recovery diodes.

As an additional feature of the present invention, power supply 16 of FIG. 2 functions to disable peak detector 20 of FIG. 1 until the storage capacitors have been sufficiently charged to raise the voltage on bus 18 substantially into regulation. To this end, when the voltage on bus 18 is so low that the voltage at junction 42 is less than the zener voltage of diode D1, no current flows through this diode to develop a voltage drop across resistor R4. The upper end of this resistor is connected to the emitter of a transistor Q9, whose base is connected to bus 19 through a diode connected transistor Q10. The common collector and base of this transistor is connected to regulated voltage bus 18 through a resistor R13. The collector of transistor Q9 is connected to the base of a dual collector transistor Q11, whose emitter is connected to bus 18. One collector of transistor Q11 is connected to the base of an emitter follower transistor Q12, whose collector is connected to bus 18 and whose emitter is brought out to an output terminal to which a lead running to another trip unit network, such as a ground fault trip mode network, disclosed in my commonly assigned application entitled "Ground Fault Trip Mode Network For Static Trip Circuit Breakers", Ser. No. 62,387, filed concurrently herewith. The other collector of transistor Q11 is brought out to a terminal to which lead 28 going to peak detector 20 in FIG. 1 is connected.

When the voltage at junction 42 is below the zener voltage of diode D1, the emitter of transistor Q9 is essentially at the potential of negative voltage bus 14. The bias current through resistor R13 and transistor Q10 then develops the requisite-base emitter voltage to turn transistor Q9 on and thus conduct base drive current for transistor Q11. This transistor turns on, causing its collector voltages to go high. The voltage on one collector is applied via lead 28 to disable the peak detector 20, which then, in turn, disables trip coil driver circuit 24, over lead 30. The high voltage on its other collector is communicated via emitter follower transistor Q12 to another trip unit network for the disablement thereof. When the voltage on bus 18 rises to 14 volts, for example, zener diode D1 starts conducting current through resistor R4, raising the emitter voltage of transistor Q9. This transistor begins to shut off, as does transistor Q11, and the collector voltages of the latter fall off to remove the disabling restraints on peak detector 20 and, in turn, trip coil and driver circuit 24. It is thus seen that transistors Q9 and Q11 function as a voltage switch responsive to the supply voltage level to selectively enable the overcurrent measurement and tripping functions. This eliminates malfunctions occasioned by transient "races" between signal and reference voltages, in addition to assuring adequate trip coil actuating current.

As seen in FIG. 2, lead 32 from trip coil and driver circuit 24, which is preferably constructed in the manner disclosed in my commonly assigned application entitled "Target Circuit For Circuit Breaker Static Trip Unit", Ser. No. 62,386, filed concurrently herewith, is brought into the junction between resistors R9 and R10 which is common to the base of transistor Q3. When the thyristor in circuit 24 is triggered to draw activating current through the trip coil, a current signal is impressed on lead 32 sufficient to forward bias the emitter-base junction of transistor Q3. This transistor turns on to, in turn, turn Darlington pair 40 on, thereby allowing the collapse of the regulated voltage across buses 18 and 19 to effectively prevent overdriving of the trip coil.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. In a circuit breaker electronic trip unit connected to receive rectified current inputs from individual phase current sensing transformers and including a burden resistor across which is developed a signal voltage proportional to the magnitude of the input current magnitude, a peak detector responsive to the signal voltage, at least one trip mode network processing the signal output of the peak detector pursuant to issuing a trip signal, and a driver circuit responsive to the trip signal for initiating energization of a trip coil operating no effect opening of breaker contacts, a power supply circuit for providing operating power for the peak detector, trip mode network, driver circuit and trip coil, said power supply circuit including, in combination:

A. a power transistor connected between first and second regulated voltage buses;
B. at least one storage capacitor connected between said first and second buses;
C. a potential divider connected between said first and second buses for developing at a terminal thereof a monitoring voltage proportional to the regulated voltage across said buses;
D. voltage threshold means responsive to said monitoring voltage;
E. a regenerative trigger circuit operating under the control of said threshold means to maintain the voltage across said buses in regulation by switching said power transistor off when the regulated voltage falls below its regulated level to direct the input current flowing through the burden resistor into said storage capacitor to increase the charge thereon and by switching said power transistor on when the regulated voltage rises above its regulated level to shunt input current flowing through the burden resistor from said storage capacitor; and
F. a diode serially connected in one of said first and second buses to prevent said storage capacitor from discharging through said power transistor while it is on.

2. The power supply circuit defined in claim 1, which further includes means conditioned by said threshold means for inhibiting the response of the peak detector to the signal voltage while the voltage across said buses is out of regulation.

3. The power supply circuit defined in claim 1, wherein said power transistor is connected to be turned on in response to a signal from the driver circuit while the trip coil is being energized to trip the breaker contacts open, whereby to collapse the voltage across said first and second buses.

4. The power supply circuit defined in claim 1 which further includes a control transistor conditioned by said trigger circuit to switch said power transistor on and off, and wherein said trigger circuit includes first and second transistors interconnected as a current mirror and a third transistor connected as a source of base drive current for said control transistor, said second transistor connected with said third transistor to shunt base drive current therefrom, and said threshold means connected with said first transistor to initially control the conduction thereof, whereby to regeneratively increase and decrease the conduction of said third transistor pursuant to switching said power transistor on and off via said control transistor.

5. The power supply circuit defined in claim 4, wherein said voltage threshold means includes a zener diode and the base-emitter junction of a fourth transistor connected in series between said voltage divider terminal and said second bus, at a nominal regulated level of the voltage across said buses, said monitoring voltage equalling the zener voltage of said zener diode and the base-emitter voltage drop of said fourth transistor, the collector voltage of said fourth transistor being applied to said trigger circuit to control the initial conduction of said first transistor.

6. The power supply circuit defined in claim 5, which further includes voltage responsive switch means connected with the junction of said zener diode and said fourth transistor and operative to disable the peak detector while said monitoring voltage is below the zener voltage of said zener diode.

7. The power supply circuit defined in claim 6, wherein said control transistor is connected to receive a signal from the driver circuit to switch said power transistor on while the trip coil is being energized to trip the breaker contacts.

8. The power supply circuit defined in claim 7, wherein said power transistor is in the form of a Darlington pair.

* * * * *

UNITED STATES PATENT OFFICE
CERTIFICATE OF CORRECTION

PATENT NO. : 4,271,447
DATED : June 2, 1981
INVENTOR(S) : Edward K. Howell

It is certified that error appears in the above-identified patent and that said Letters Patent are hereby corrected as shown below:

Claim 1, line 10, change "no" to -- to --

Signed and Sealed this

Fourth Day of August 1981

[SEAL]

Attest:

Attesting Officer

GERALD J. MOSSINGHOFF

Commissioner of Patents and Trademarks